(12) United States Patent
Liu et al.

(10) Patent No.: US 8,426,481 B2
(45) Date of Patent: Apr. 23, 2013

(54) COMPOSITE MATERIAL

(75) Inventors: Yan Liu, Hässleholm (SE); Johan Billing, Lund (SE); Ecevit Yilmaz, Bjärred (SE); Ola Karlsson, Lund (SE)

(73) Assignee: Biotage AB, Uppsala (SE)

( * ) Notice: Subject to any disclaimer, the term of this patent is extended or adjusted under 35 U.S.C. 154(b) by 195 days.

(21) Appl. No.: 12/736,285

(22) PCT Filed: Mar. 27, 2009

(86) PCT No.: PCT/EP2009/053642
§ 371 (c)(1),
(2), (4) Date: Nov. 15, 2010

(87) PCT Pub. No.: WO2009/118401
PCT Pub. Date: Oct. 1, 2009

(65) Prior Publication Data
US 2011/0089608 A1   Apr. 21, 2011

(30) Foreign Application Priority Data
Mar. 28, 2008   (SE) ........................................ 0800701

(51) Int. Cl.
*C08F 12/36* (2006.01)
(52) U.S. Cl.
USPC ................ 521/54; 521/55; 521/146; 428/402
(58) Field of Classification Search .................... 521/54, 521/55, 146; 428/402
See application file for complete search history.

(56) References Cited

U.S. PATENT DOCUMENTS

| 4,152,496 A | 5/1979 | Barrett et al. | |
| 4,753,985 A * | 6/1988 | Rosevear et al. | 525/54.11 |
| 4,965,289 A | 10/1990 | Sherrington et al. | |
| 5,066,784 A | 11/1991 | Sherrington et al. | |
| 5,248,435 A | 9/1993 | Morita et al. | |
| 5,593,729 A | 1/1997 | Frechet et al. | |
| 5,882,521 A | 3/1999 | Bouvier et al. | |
| 6,635,174 B1 * | 10/2003 | Berg et al. | 210/198.2 |
| 7,119,145 B2 | 10/2006 | Dixon et al. | |
| 7,282,214 B2 * | 10/2007 | Willcox et al. | 424/429 |

FOREIGN PATENT DOCUMENTS

| EP | 0288310 A2 | | 10/1988 |
| JP | 59202210 A | | 11/1984 |
| JP | 01199643 A | * | 8/1989 |
| WO | WO-9400214 A1 | | 1/1994 |
| WO | WO-9409063 A1 | | 4/1994 |
| WO | WO-2005103124 A1 | | 11/2005 |
| WO | WO-2007067140 A1 | | 6/2007 |

OTHER PUBLICATIONS

Jin, S. et al., "Synthesis and characterization of pH-sensitivity semi-IPN hydrogel based on hydrogen bond between poly(N-vinylpyrrolidone) and poly(acrylic acid)," Polymer, vol. 47, No. 5, Feb. 22, 2006, pp. 1526-1532.

Reinholdsson, P. et al., "Poly(Trimethylolpropane Trimethacrylate) Particles With Acid Chloride Functionality," Reactive Polymers, vol. 17, Issue 2, May 1992, pp. 175-186.

Wojcik, Anna, "Preliminary results on the gas chromatographic evaluation of interpenetrating polymer networks prepared from porous polymer beads," Journal of Chromatography, vol. 502, 1990, pp. 393-400.

Hargitai, T. et al., "Polymer-bound chiral polymers for use in enantiomer separations," Journal of Chromatography, vol. 540, 1991, pp. 145-155.

Hargitai, T. et al., "Functionalized polymer particles for chiral separation," Journal of Chromatography, vol. 630, 1993, pp. 79-94.

* cited by examiner

*Primary Examiner* — Irina S Zemel
(74) *Attorney, Agent, or Firm* — Harness, Dickey & Pierce, P.L.C.

(57) ABSTRACT

An embodiment of the present invention relates to a composite material including a hydrophobic porous organic polymer bead. An embodiment further relates to a method of obtaining the composite material as well as the use thereof.

18 Claims, 5 Drawing Sheets

COMPOSITE MATERIAL

This is a National Phase of PCT Patent Application No. PCT/EP2009/053642, filed on Mar. 27, 2009, which claims priority under 35 U.S.C. §119 to Sweden Patent Application No. 0800701-5, filed on Mar. 28, 2008, the contents of each of which are hereby incorporated herein by reference in their entirety.

BACKGROUND OF THE INVENTION

Polymeric beads that are used in the separations industry are often based on either hydrophobic or hydrophilic monomers. One example of beads based on hydrophobic monomers are polystyrene-divinylbenzene (PS-DVB) beads that are useful hydrophobic separation materials, e.g. for reversed-phase chromatography or solid-phase extraction. An example of beads based on hydrophilic monomers are beads made from acrylamide and N,N'-methylenebisacrylamide that are useful hydrophilic separation materials, e.g. for size-exclusion chromatography.

The polymeric beads are most often produced by suspension polymerization where the monomer phase is not soluble in the continuous phase and instead forms droplets in the continuous phase. For example, styrene and divinylbenzene can be suspended in water using a propeller-type stirrer that disperses the monomer mixture, which often also contains a porogenic solvent and an initiator. Similarly, hydrophilic monomers can be dispersed in a non-polar continuous phase. For example, a solution of acrylamide, N,N'-methylenebisacrylamide and an initiator in water may be dispersed in mineral oil or an organic solvent such as chloroform. In both cases, a suitable surface active stabilizer may be added to facilitate the dispersion and stabilize the formed droplets. The polymerization reaction is initiated by heating and crosslinked polymer beads are obtained. This well known technique of suspension polymerization is widely used in the polymer industry to produce a wide range of polymer bead materials for use in a variety of separation processes.

In order to produce polymer beads with mixed chemistries, post-treatments of the polymer beads are known. Polystyrene-divinylbenzene beads may for example be treated with various chemicals to introduce ionic moieties or groups in the bead material and this is a common route for producing ion-exchange polymer bead materials. However, if ionic moieties or other very hydrophilic moieties are to be introduced directly into the beads by copolymerization during the suspension polymerization process, solubility issues may prevent the formation of the desired beads. If for example charged ionic monomers are mixed with hydrophobic monomers in a water-based suspension process, a copolymerization may not always occur as the monomers may partition into different phases of the two-phase system. This means that the desired copolymer will not be formed.

Reinholdsson et al (Reactive Polymers, Volume 17, Issue 2, May 1992, Pages 175-186) and Hargitai et al (Journal of Chromatography A, Volume 540, 1991, Pages 145-155 and Journal of Chromatography A, Volume 630, Issues 1-2, 5 Feb. 1993, Pages 79-94) disclose grafting of acryloyl chloride, methacryloyl chloride and (S)—N-acryloylphenylalanine ethyl ester onto poly(trimethylolpropane trimethacrylate) (TRIM) beads. The grafted polymer is not crosslinked and does not form its own network within the TRIM beads.

JP 59 202 210 discloses grafting of water-soluble monomers to polystyrene-divinylbenzene beads to give a grafted polymer bead. The polymer is useful for analysis of water-soluble polymers.

U.S. Pat. No. 7,119,145 discloses grafting of polystyrene-divinylbenzene copolymer beads with 1-vinyl-2-pyrrolidone to give a grafted polymer bead. The grafted polymer is not crosslinked and does not form its own network within the polystyrene/divinylbenzene beads. It further discloses a grafting method not affecting the morphology and physical structure of the polymer bead.

U.S. Pat. No. 5,882,521 discloses a copolymer of divinylbenzene and 1-vinyl-2-pyrrolidone. The polymer is produced in one step such that the monomers can be assumed to be randomly distributed throughout the polymer.

Even though a wide range of solid-phase separation materials are known, there are still separation applications where the existing materials do not have a desired combination of retention, selectivity and high recovery.

Consequently there is a need for solid-phase separation materials having improved separation characteristics. One object of the present invention is to provide a separation material having improved separations characteristics. One object is to provide a material for solid-phase separations such as solid-phase extraction (SPE) and chromatographic separations.

SUMMARY OF THE PRESENT INVENTION

The present invention relates to a material for solid phase separation. The present invention relates to a solid phase separation material having different separation characteristics compared to known separation materials.

The object of the present invention is achieved by a composite material comprising a hydrophobic porous organic polymer bead comprising a hydrophobic non-porous polymer phase and pores, wherein said hydrophobic non-porous polymer phase internally comprises a hydrophilic polymer; and wherein the composite material is characterized by having a substantially hydrophobic outer surface and pores having surfaces being less hydrophobic than said outer surface.

The object of the invention is also achieved by a method of preparing the composite material comprising the steps:
a) providing at least one hydrophobic porous organic polymer bead comprising a hydrophobic non-porous polymer phase and pores; and a mixture of at least one hydrophilic monomer, selected from monomers having at least one polymerizable group, optionally an initiator, and optionally a solvent,
c) swelling said bead in said mixture, forming a swollen hydrophobic porous organic polymer bead comprising said mixture internally in the hydrophobic non-porous polymer phase;
d) polymerizing said at least one hydrophilic monomer; and
e) obtaining said composite material;
wherein all of said mixture is absorbed by said hydrophobic porous organic polymer bead; or any excess removed before polymerization.

In one aspect the object of the present invention is achieved by using the composite material as described above and in the accompanying claims in solid phase extraction or chromatographic separation. In one aspect the composite material of the invention is used in a solid phase extraction cartridge or chromatography column.

DETAILED DESCRIPTION OF THE PRESENT INVENTION

In one aspect the invention relates to a composite material comprising a hydrophobic porous organic polymer bead wherein said bead comprises a hydrophobic non-porous polymer phase and pores, wherein said hydrophobic non-porous polymer phase internally comprises a hydrophilic polymer. In some aspects of the present invention the terms "pore" or "pores" are intended to mean a void of at least 10 Å (Angström) in diameter. In some aspects of the present invention the term "non-porous polymer phase" is intended to mean a polymer phase that contains no pores. In some aspects of the present invention the hydrophobic porous organic polymer bead comprises pores and a hydrophobic non-porous polymer phase. Said hydrophobic non-porous polymer phase may constitute walls of the pores and may be referred to as the bulk of the pre-existing hydrophobic organic polymer.

Figure 1:
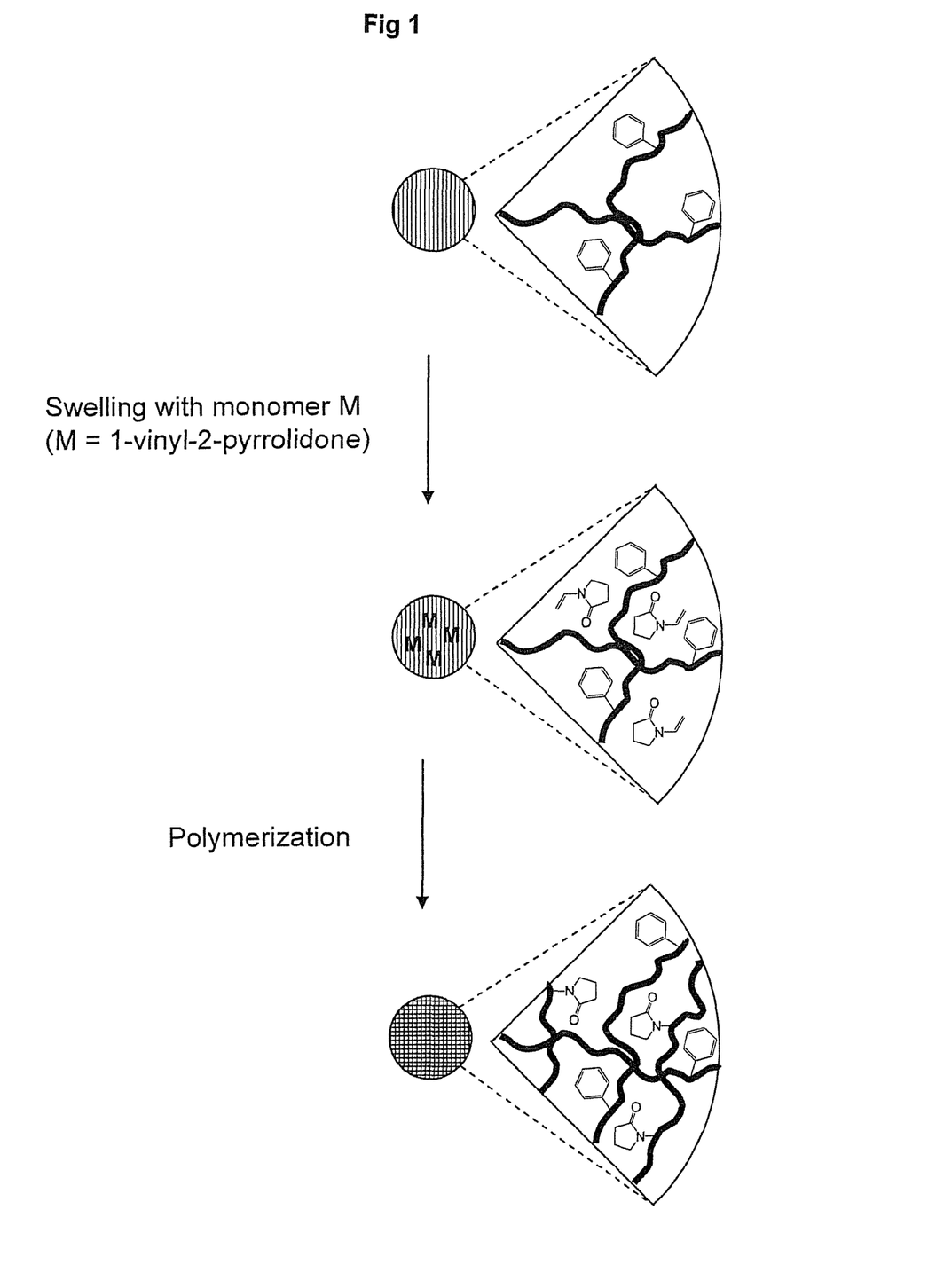
FIG. 1 illustrates the preparation of the composite material from a hydrophobic porous organic polymer bead.

The composite material is obtainable by swelling a hydrophobic porous organic polymer bead or a collection of such beads with a mixture containing one or more hydrophilic monomers, optionally a crosslinker which may or may not be hydrophilic, optionally a solvent and optionally an initiator. In one embodiment the mixture contains one or more hydrophilic monomers, a crosslinker which may be hydrophobic or hydrophilic, a solvent and an initiator. The mixture is then polymerized and a composite material is obtained. FIG. 1 illustrates the process for the preparation of the composite material when the hydrophobic porous organic polymer bead is based on styrene and the hydrophilic polymer is based on 1-vinyl-2-pyrrolidone. The hydrophobic non-porous polymer phase is a polymer not containing pores as defined herein.

If the volume of the mixture containing one or more hydrophilic monomers, optionally a crosslinker which may or may not be hydrophilic, optionally a solvent and optionally an initiator exceeds the maximum uptake capacity of the hydrophobic porous organic polymer bead, the excess is removed before polymerization. This ensures that substantially all of the hydrophilic monomer is inside the hydrophobic porous organic polymer bead when the polymerization is initiated.

In this process, polymerization takes place substantially within the hydrophobic non-porous polymer phase of the pre-existing hydrophobic polymer bead (and not within the pores of the hydrophobic polymer bead) such that novel bead architecture is obtained, namely a bead with a substantially hydrophobic outer surface and pores having a surface being less hydrophobic than said outer surface. In some embodiments of the invention, the volume of the mixture containing one or more hydrophilic monomers, optionally a crosslinker which may or may not be hydrophilic, optionally a solvent and optionally an initiator is chosen such that it is equal to or less than the maximum uptake capacity of the hydrophobic porous organic polymer bead.

The present inventors have found that an excess of the above mentioned mixture causes aggregation of the hydrophobic porous organic polymer bead upon polymerization.

In some embodiments the surface of the pores may be at least partly hydrophobic, and in some embodiments the surface of the pores is hydrophobic.

Hydrophobic or hydrophilic monomers, as well as crosslinker comprise at least one polymerizable group. The polymerizable group may be selected from a vinyl group, isopropenyl group, carboxylic acid, carboxylic ester, carboxylic amide, alcohol, amine, epoxide, aziridine or other groups known to a person skilled in the art. In some embodiments the vinyl group or the isopropenyl group is preferred.

In one aspect the invention relates to a method of preparing the composite material comprising providing at least one hydrophobic porous organic polymer bead; and a mixture of at least one hydrophilic monomer, selected from monomers having at least one polymerizable group, optionally an initiator, and optionally a solvent; swelling said bead in said mixture, forming a swollen bead comprising said mixture internally in the hydrophobic non-porous polymer phase; polymerizing said at least one hydrophilic monomer; and obtaining said composite material; wherein all of said mixture is absorbed by said hydrophobic porous organic polymer bead; or any excess removed before polymerization.

The at least one hydrophobic porous organic polymer bead is obtainable by providing a mixture of hydrophobic monomers having at least one polymerizable group and a porogen; dispersing the mixture in a medium; polymerizing the hydrophobic monomers and obtaining the hydrophobic porous organic polymer bead.

The hydrophobic non-porous polymer phase of the polymer bead may be based on styrene, divinylbenzene, ethylene glycol dimethacrylate, trimethylolpropane trimethacrylate or any other hydrophobic monomer or any combination thereof. Small amounts of hydrophilic monomers may also be included as long as the overall character of the polymer bead is substantially hydrophobic. In some embodiments of the invention, the hydrophobic non-porous polymer phase of the polymer bead is a crosslinked hydrophobic polymer. In some embodiments of the invention, said hydrophobic porous organic polymer bead is obtained from styrene and divinylbenzene. The hydrophobic porous organic polymer bead may be prepared by suspension polymerization or any other method.

The hydrophilic monomer should confer hydrophilic properties to the polymer. The hydrophilic monomer or monomers may be 1-vinyl-2-pyrrolidone, 2-hydroxyethyl methacrylate, N,N'-ethylenebisacrylamide, N,N'-methylenebisacrylamide, acrylamide, methacrylamide, poly(ethylene glycol) diacrylate or dimethacrylate comprising two or more ethylene glycol units, acrylonitrile or any other hydrophilic monomer or any combination thereof. Small amounts of hydrophobic monomers may also be mixed with the hydrophilic monomers as long as the overall character of the monomer mixture is substantially hydrophilic. In one embodiment of the invention, one of the monomers in the hydrophilic monomer mixture is a crosslinker. The crosslinker may be divinylbenzene, ethylene glycol dimethacrylate, trimethylolpropane trimethacrylate, poly(ethylene glycol) monoacrylate, monomethacrylate, diacrylate or dimethacrylate comprising two or more ethylene glycol units or any other crosslinker. In one embodiment of the present invention, it is preferred to use a combination of 1-vinyl-2-pyrrolidone and ethylene glycol dimethacrylate.

The present inventors have found that by introducing a hydrophilic monomer and allowing it to polymerize within a hydrophobic non-porous polymer phase, a composite material is formed. Said composite material contains the hydrophilic portion within the non-porous polymer phase giving it different properties than a hydrophobic porous polymer bead modified to contain hydrophilic groups mainly attached to the surface. The present invention thus makes it possible to generate composite materials having different properties, such as having pores being less hydrophobic than the outer surface of the composite.

In some embodiments of the invention, the hydrophilic monomer may contain ionic or ionizable groups. Non-limiting examples of such monomers include (ar-vinylbenzyl) trimethylammonium chloride, N,N-diethylaminoethyl methacrylate, methacrylic acid and 2-acrylamido-2-methylpropanesulfonic acid.

In some embodiments of the invention conventional methods may be used to surface modify the composite material to introduce ionic groups, ionizable groups, hydrophilic groups, polar groups or any combination thereof. Such embodiments comprise e.g. sulfonation or aminomethylation of the composite material. Some embodiments comprise chloromethylation of the composite material followed by displacement of chlorine with an amine, such as a primary, secondary or tertiary amine, ammonia, alcohol, water or thiol.

If a solvent is used, the solvent can be toluene, methanol, acetonitrile, ethyl acetate, tetrahydrofuran, N,N-dimethylformamide, 1-methyl-2-pyrrolidone, dimethyl sulfoxide or any other solvent or mixture of solvents. In one embodiment of the invention, a solvent that induces a high degree of swelling of the hydrophobic porous organic polymer bead is chosen. In one embodiment of the invention, water may be part of the solvent mixture.

If an initiator is used, the initiator may be an azo initiator such as 2,2'-azobis(2-methylpropionitrile) (AIBN) or 2,2'-azobis(2,4-dimethylvaleronitrile) (ABDV) or a peroxide initiator such as benzoyl peroxide or tert-butyl peroxide or any other radical initiator. Polymerization may be initiated thermally or by irradiation with UV light.

The swelling and polymerization steps may be performed in different ways such as:
(i) Adding a mixture of hydrophilic monomers, optionally a solvent and optionally an initiator to dry hydrophobic porous organic polymer beads, stirring until the beads are evenly swollen by the mixture and polymerizing. The volume of the mixture is less than or substantially equal to the maximum uptake capacity of the hydrophobic porous organic polymer beads.
(ii) Adding an excess of a mixture of hydrophilic monomers, optionally a solvent and optionally an initiator to dry hydrophobic porous organic polymer beads, stirring until the beads are evenly swollen by the mixture, substantially removing the excess liquid by filtration, centrifugation or any other means, and thereafter polymerizing.
(iii) Adding a mixture of hydrophilic monomers, optionally a solvent and optionally an initiator to dry hydrophobic porous organic polymer beads, stirring until the beads are evenly swollen by the mixture, suspending the swollen beads in an aqueous solution, polymerizing and recovering the composite beads from the suspension. The volume of the mixture is less than or substantially equal to the maximum uptake capacity of the hydrophobic porous organic polymer beads.
(iv) Adding a mixture of hydrophilic monomers, optionally a solvent and optionally an initiator to a suspension of hydrophobic porous organic polymer beads in an aqueous solution, stirring until the beads are evenly swollen by the mixture, polymerizing and recovering the composite beads from the suspension. The volume of the mixture is less than or substantially equal to the maximum uptake capacity of the hydrophobic porous organic polymer beads.
(v) Preparing hydrophobic porous organic polymer beads in a suspension polymerization reaction in an aqueous solution using hydrophobic monomers where one of the monomers may or may not be a crosslinker, optionally a porogen and optionally an initiator and optionally a stabilizer, optionally removing the porogen partly or completely from the suspension by distillation or evaporation, adding a mixture of hydrophilic monomers, optionally a solvent and optionally an initiator to the suspension, stirring until the beads are evenly swollen by the mixture, polymerizing and recovering the composite beads from the suspension. The combined volume of the mixture and the remaining porogen is less than or substantially equal to the maximum uptake capacity of the hydrophobic porous organic polymer beads.

A person skilled in the art realizes that other variations of the process are possible.

In one embodiment of the present invention, the obtained composite material is washed and dried before use.

When composite materials are prepared using this method, the morphological and physical properties of the composite material are different from those of the starting hydrophobic porous organic polymer beads. As can be seen in the examples, the composite material has a larger bead diameter, lower degree of swelling, lower surface area and increased pore volume compared to the hydrophobic porous organic polymer beads it was made from. The larger average diameter and pore volume indicates that the new hydrophilic polymer is to a substantial extent not formed in the pores, but within the bulk of the pre-existing hydrophobic organic polymer. It is expected that the formed hydrophilic polymer is interpenetrated with the pre-existing hydrophobic non-porous polymer phase, i.e. the polymer chains or networks are inseparably entangled with each other. This is pronounced in an embodiment of the invention where a crosslinker is part of the hydrophilic monomer mixture. The interpenetration is reflected in the reduced swelling. The pore volume, pore size distribution and surface area of the organic polymer beads and the composite material is determined according to BET analysis (Brunauer, Emmett, and Teller analysis).

The pore size distribution of the composite material is also different compared to that of the starting hydrophobic porous organic polymer beads. The starting hydrophobic porous organic polymer beads have the wide pore size distribution that is typical for such polymers formed in the presence of a liquid porogen. The composite material on the other hand surprisingly has a more uniform pore size distribution, as may be seen in FIG. 3, which is a highly desirable property for a separation material.

In one embodiment of the present invention, polystyrene-divinylbenzene beads were swollen with a mixture of 1-vinyl-2-pyrrolidone, a small amount of a crosslinker, an initiator and toluene and then polymerized such that a composite material comprising a hydrophobic porous organic polymer bead wherein said beads comprise a hydrophobic non-porous polymer phase and pores, wherein said hydrophobic non-porous polymer phase internally comprises a hydrophilic polymer was obtained. When using said composite material as an adsorbent for solid-phase extraction with a range of test compounds (see example 7), we observed an average of 98% recovery for the test compounds used which is an excellent result. Surprisingly, the composite material had considerably higher recoveries than a conventional copolymer of divinylbenzene and 1-vinyl-2-pyrrolidone. For some extractions such an increase is very valuable and enables a wide scope of applications.

One surprising advantage of the material is that when used as an adsorbent for solid-phase extraction, the sensitivity to accidental drying out of the material is very low. When extensive drying of the material was carried out in the solid-phase extraction procedure, the average recovery dropped to 92%, i.e. only a small reduction. This ensures a high reproducibility of the extraction even when accidental drying of the material takes place during the extraction process. Under normal conditions, accidental drying out will not be as extensive as the drying in this example and the reduction in recovery will be even smaller.

Thus we have observed that a composite material comprising a hydrophobic porous organic polymer bead wherein said bead comprises a hydrophobic non-porous polymer phase and pores, wherein said hydrophobic non-porous polymer phase internally comprises a hydrophilic polymer leads to an unexpected improvement of overall performance when used as a solid-phase extraction material. After further analysis of the material we concluded that the improved performance must be due to the novel bead architecture that this obtained with this method of composite formation, namely a substantially hydrophobic outer surface and pores having a surface being less hydrophobic than said outer surface. In some aspects the surface of the pores may be at least partly hydrophobic, and in some aspects the surface of the pores is hydrophobic.

It has been determined that the outer surface of the composite material is substantially hydrophobic by performing wetting experiments (see examples). The composite material and the hydrophobic porous organic polymer beads it was made from are both not wettable with water within 24 h while a conventional copolymer of divinylbenzene and 1-vinyl-2-pyrrolidone is instantly wettable with water. The composite material and the hydrophobic porous organic polymer bead are independently not wettable with water within 24 h without the use of assisting means. However, the composite material can easily be wetted with water if it has first been wetted with a water-miscible organic solvent such as methanol, and in that case the retention of hydrophobic compounds in aqueous systems is similar to that of a conventional copolymer of divinylbenzene and 1-vinyl-2-pyrrolidone, i.e. a material that is considerably less hydrophobic than the starting hydrophobic porous organic polymer beads. Since most of the surface of a porous material is inside the pores, this demonstrates that the surface of the pores of the composite material is less hydrophobic than in the original hydrophobic porous organic polymer beads and consequently less hydrophobic than the outer surface of the composite material.

Thus the composite material is a polymer composite comprising a hydrophobic outer surface and a less hydrophobic interior surface of the pores. Such properties are novel and lead to improved performance.

The composite materials according to the present invention are thus suitable to be used as a solid phase adsorbent for extraction or chromatographic separation etc. The composite materials of the invention may be used to extract compounds contained in a liquid or gaseous medium. The material may be packed in a column or stirred with a medium containing the compounds to be extracted or used in other ways known to a person skilled in the art. The material may be used in a solid phase extraction cartridge or chromatography column.

As used in the present invention, the term "hydrophilic monomer" means a monomer that has at least one hydrophilic group.

As used in the present invention, the term "hydrophobic monomer" means a monomer that does not carry a hydrophilic group.

As used in the present invention, the term "hydrophobic polymer" means a polymer prepared substantially from hydrophobic monomers.

As used in the present invention, the term "hydrophilic polymer" means a polymer prepared substantially from hydrophilic monomers.

As used in the present invention, the term "crosslinker" means a monomer with more than one polymerizable group.

As used in the present invention, the term "crosslinked polymer" means a polymer prepared from one or more monomers wherein at least one monomer is a crosslinker.

As used in the present invention, the terms "porogen" or "porogenic solvent" means a solvent that is present in a polymerization reaction and leads to the formation of a porous polymer.

As used in the present invention, the term "bead" means a spherical or near-spherical particle.

As used in the present invention, the term "swelling" means a process where a liquid is absorbed by a polymer bead accompanied by an increase of the total volume of the polymer bead.

As used in the present invention, the term "maximum uptake capacity" means the maximum volume of a liquid that can be absorbed by a polymer bead during swelling.

As used in the present invention, the term "interpenetrated" means that two or more polymer chains or networks are inseparably entangled.

As used in the present invention, the term "outer surface" means the surface on the outer shell of a bead.

As used in the present invention, the term "surface of the pores" means the surface of the pores inside a bead.

As used in the present invention, "ionizable group" means a chemical moiety that can be made ionic by changing the pH of the environment.

As used in the present invention, the term "solid-phase separation" means a separation process that involves the partitioning of compounds from a gas, liquid or other fluid to a solid material.

As used in the present invention, the term "solid-phase extraction" means an extraction process that involves the partitioning of compounds from a gas, liquid or other fluid to a solid material.

EXAMPLES

The following examples are illustrative examples only and should not in any way be interpreted as limiting to the invention.

Example 1

Preparation of hydrophobic porous organic polymer beads. Styrene (100 mL), divinylbenzene 80% technical grade (100 mL) and 2,2'-azobis(2,4-dimethylvaleronitrile) (3.0 g) are dissolved in a mixture of benzyl alcohol (200 mL) and chloroform (150 mL) and the solution is added to a 0.5% solution of polyvinylalcohol (Celvol 523) in deionized water (1150 mL). The two-phase mixture is stirred with 300 rpm at 50° C. for 15 h. After cooling, the formed hydrophobic porous organic polymer beads are collected by sieving, washed with methanol on a glass filter and dried.

Figure 2:
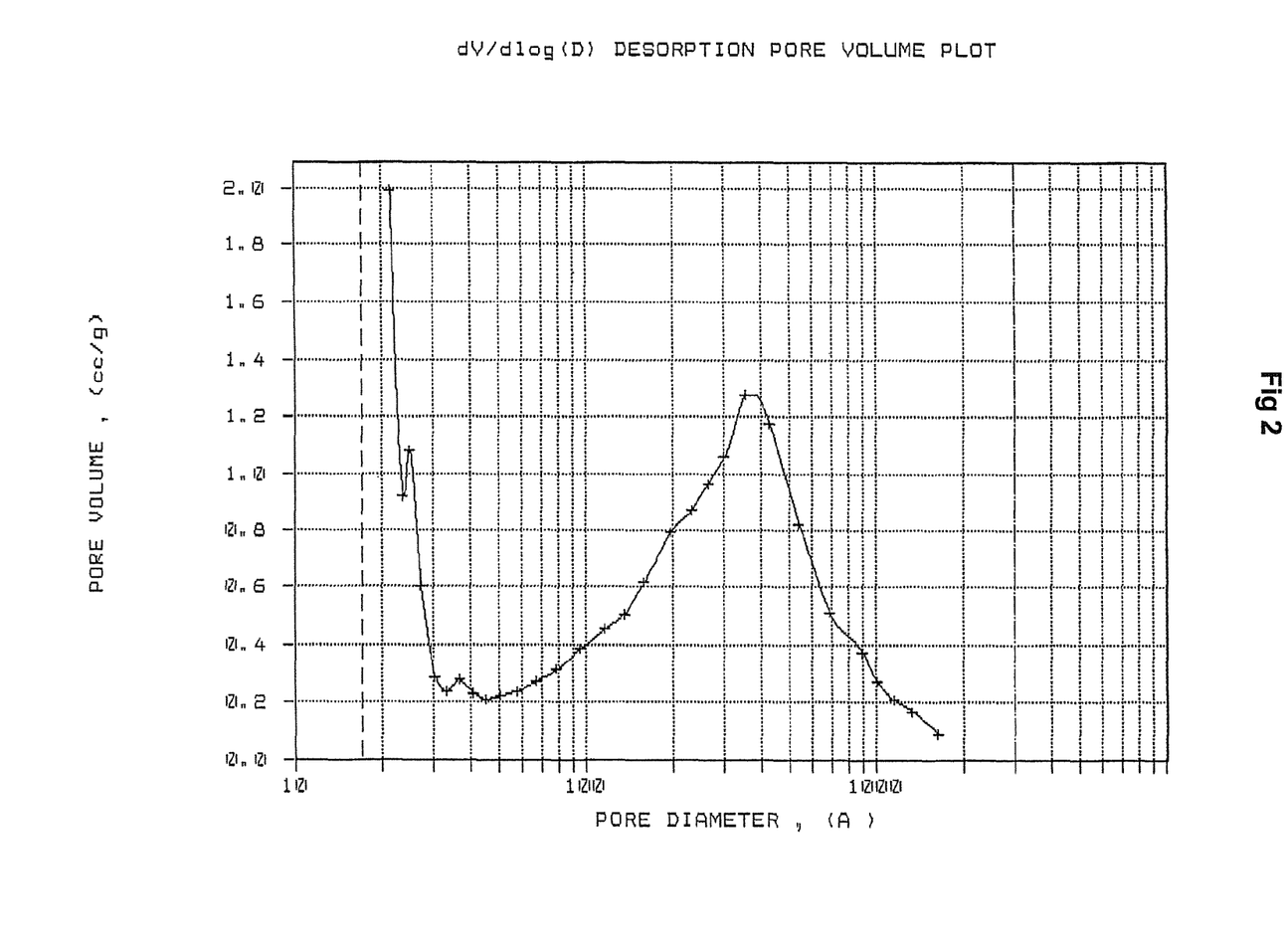
FIG. 2 illustrates the pore size distribution of the hydrophobic porous organic polymer beads.

Properties of the Hydrophobic Porous Organic Polymer Beads:

| | |
|---|---|
| Average particle size (D[4, 3]): | 61 μm |
| Total area: | 440 m$^2$/g |
| Pore volume: | 0.93 mL/g |
| Pore size distribution: | See FIG. 2 |
| Nitrogen content: | 0.15% (residues from initiator) |
| Volume increase upon swelling in toluene: | 37% |
| Maximum uptake of toluene: | 2 mL/g |

Example 2

Figure 3:
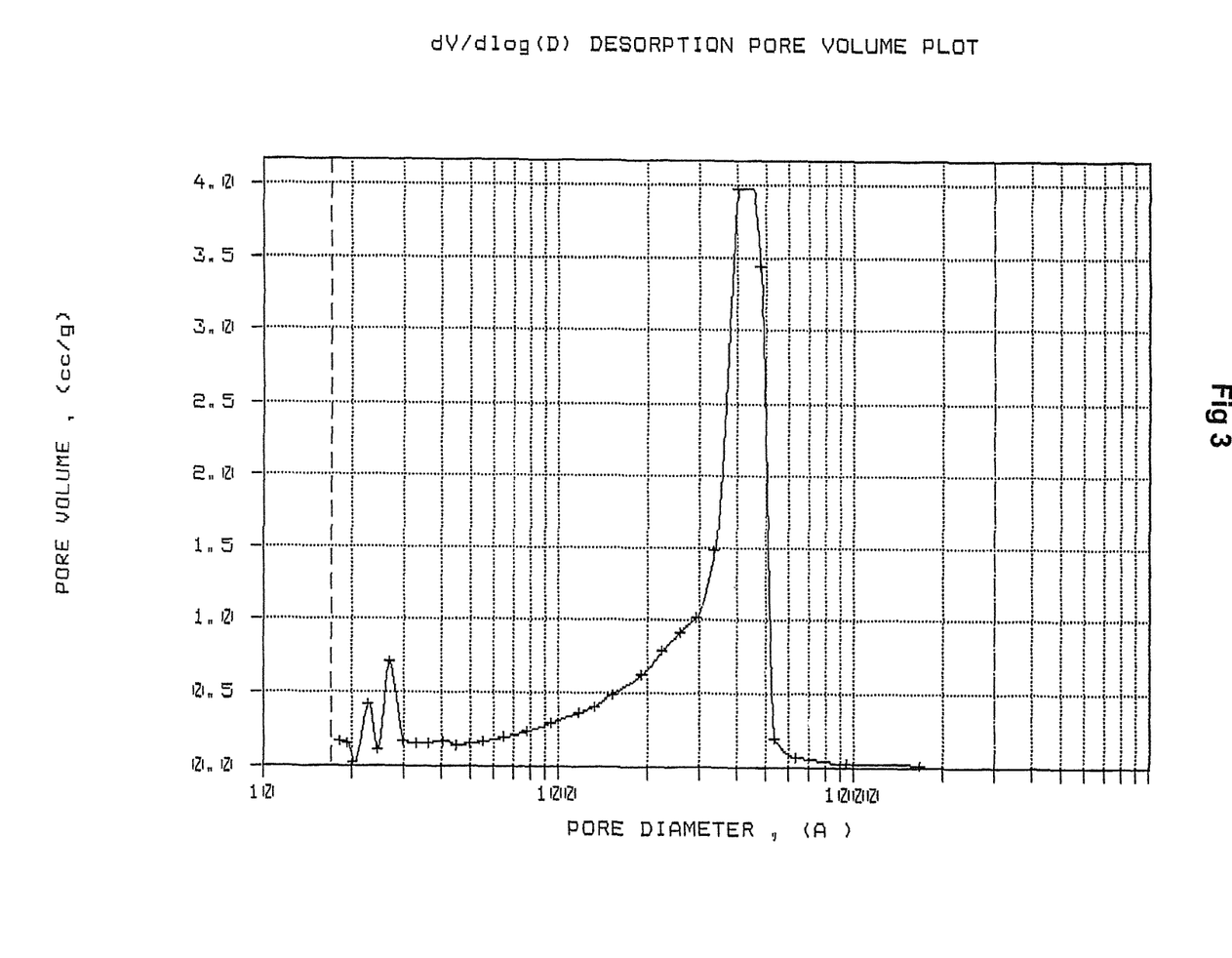
FIG. 3 illustrates the pore size distribution of the obtained composite material.

Preparation of composite material. A monomer solution containing 0.25 g 1-vinyl-2-pyrrolidone, 2.5 mg ethylene glycol dimethacrylate and 12 mg 2,2'-azobis(2,4-dimethylvaleronitrile) dissolved in 1.75 mL of toluene is prepared. The monomer solution is sonicated and purged with nitrogen to remove dissolved oxygen and is then added to 1.0 g of hydrophobic porous organic polymer beads from example 1. The mixture is stirred and shaken such that the hydrophobic porous organic polymer beads become evenly swollen with the mixture and the appearance is that of a dry powder. The swollen beads are heated to 55° C. for 24 h and the resulting composite material is washed with methanol and dried.
Properties of the Composite Material:

| | |
|---|---|
| Average particle size (D[4, 3]): | 67 μm |
| Total area: | 384 m$^2$/g |
| Pore volume: | 1.0 mL/g |
| Pore size distribution: | See FIG. 3 |
| Nitrogen content: | 2.43% (expected: 2.51%) |
| Volume increase upon swelling in toluene: | 31% |

Example 3

Same as example 2, but prepared with a monomer solution containing 0.25 g of 2-hydroxyethyl methacrylate, 2.5 mg N,N'-methylene bisacrylamide and 12 mg 2,2'-azobis(2,4-dimethylvaleronitrile) dissolved in 1.75 mL of THF.

Example 4

Same as example 2, but prepared with a monomer solution containing 0.25 g of N,N-diethylaminoethyl methacrylate, 2.5 mg of ethylene glycol dimethacrylate, and 12 mg 2,2'-azobis(2,4-dimethylvaleronitrile) dissolved in 1.75 mL of toluene.

Example 5

Same as example 2, but prepared with a monomer solution containing 0.20 g 2-acrylamido-2-methylpropane sulfonic acid, 0.05 g of trimethylolpropane trimethacrylate and 12 mg of 2,2'-azobis(2-methylpropionitrile) dissolved in 1.75 mL of N,N-dimethylformamide.

Example 6

A monomer solution containing 0.50 g 1-vinyl-2-pyrrolidone, 5.0 mg ethylene glycol dimethacrylate and 24 mg 2,2'-azobis(2,4-dimethylvaleronitrile) dissolved in 3.5 mL of toluene is prepared. The monomer solution is sonicated and purged with nitrogen to remove dissolved oxygen and is then added to 1.0 g of hydrophobic porous organic polymer beads from example 1. The mixture is stirred and shaken such that the hydrophobic porous organic polymer beads become evenly swollen with the mixture. The excess liquid is removed by vacuum filtration on a glass filter such that the appearance is that of a dry powder. The swollen beads are heated to 55° C. for 24 h and the resulting composite material is washed with methanol and dried.

Example 7

A monomer solution containing 0.25 g 1-vinyl-2-pyrrolidone, 2.5 mg ethylene glycol dimethacrylate and 12 mg 2,2'-azobis(2,4-dimethylvaleronitrile) dissolved in 1.75 mL of toluene is prepared. The monomer solution is sonicated and purged with nitrogen to remove dissolved oxygen and is then added to 1.0 g of hydrophobic porous organic polymer beads from example 1. The mixture is stirred and shaken such that the hydrophobic porous organic polymer beads become evenly swollen with the mixture and the appearance is that of a dry powder. The swollen beads are suspended in 20 mL of deionized water and the suspension is heated to 55° C. for 24 h. The resulting composite material is recovered from the suspension, washed with methanol and dried.

Example 8

A monomer solution containing 0.25 g 1-vinyl-2-pyrrolidone, 2.5 mg ethylene glycol dimethacrylate and 12 mg 2,2'-azobis(2,4-dimethylvaleronitrile) dissolved in 1.75 mL of toluene is prepared. The monomer solution is sonicated and purged with nitrogen to remove dissolved oxygen and is then added to a suspension of 1.0 g of hydrophobic porous organic polymer beads from example 1 in 20 mL of water. The mixture is stirred for 30 min such that the hydrophobic porous organic polymer beads become evenly swollen with the mixture and then heated to 55° C. for 24 h. The resulting composite material is recovered from the suspension, washed with methanol and dried.

Example 9

Preparation of the first hydrophobic porous organic polymer beads and then the composite material in the same reaction vessel. Styrene (100 mL), divinylbenzene 80% technical grade (100 mL) and 2,2'-azobis(2,4-dimethylvaleronitrile) (3.0 g) are dissolved in a mixture of benzyl alcohol (200 mL) and chloroform (150 mL) and the solution is added to a 0.5% solution of polyvinylalcohol (Celvol 523) in deionized water (1150 mL). The two-phase mixture is stirred with 300 rpm at 50° C. for 15 h. 100 mL of chloroform is distilled off from the suspension and the suspension is allowed to cool down. A monomer solution containing 45 g 1-vinyl-2-pyrrolidone, 0.45 g ethylene glycol dimethacrylate and 2.3 g 2,2'-azobis (2,4-dimethylvaleronitrile) dissolved in 65 mL of toluene is prepared. The monomer solution is sonicated and purged with nitrogen to remove dissolved oxygen and is then added to the suspension. The mixture is stirred for 30 min so that the hydrophobic porous organic polymer beads become evenly swollen with the mixture and then heated to 55° C. for 24 h. The resulting composite material is obtained from the suspension, washed with methanol and dried.

Example 10

Figure 4:
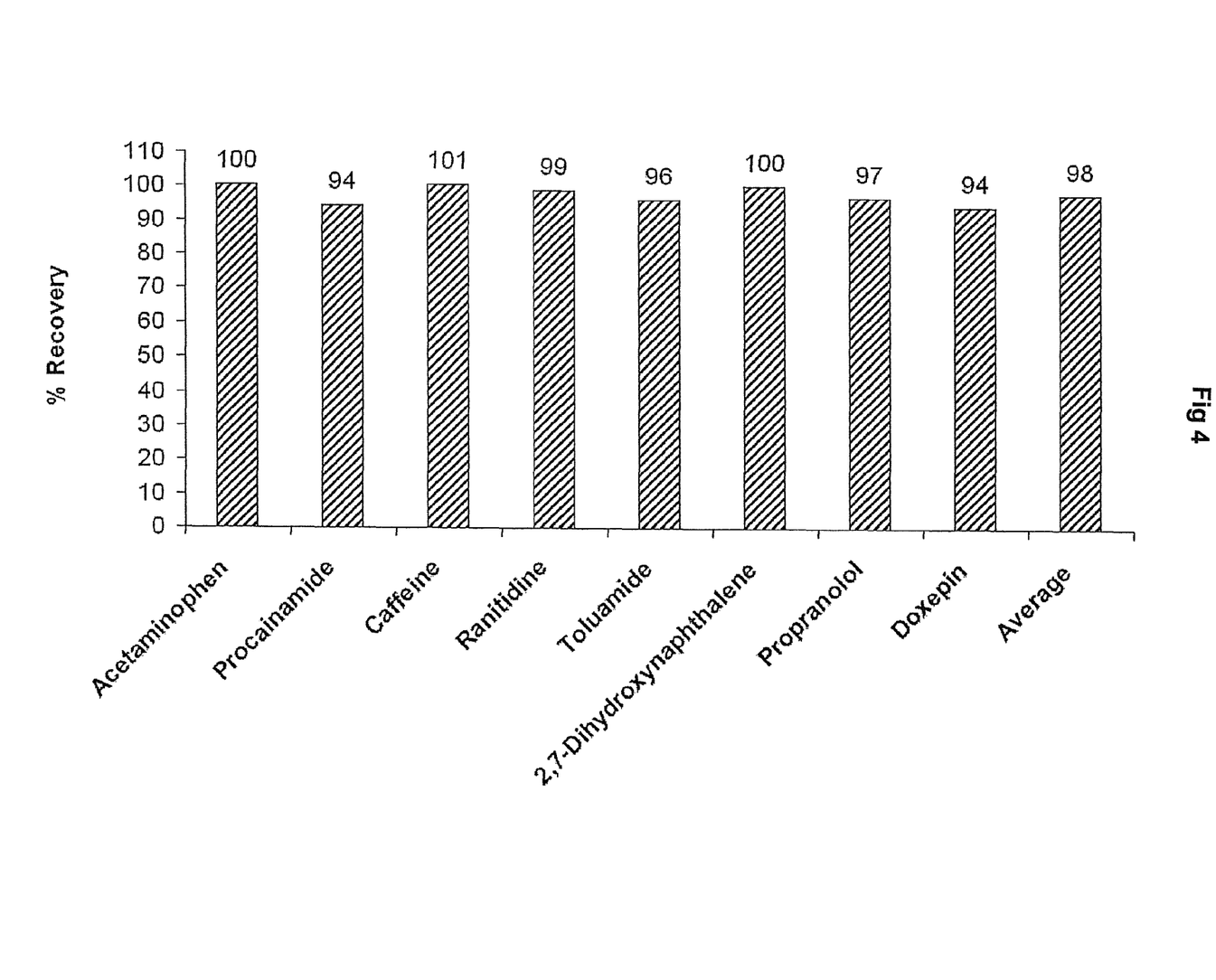
FIG. 4 illustrates the recoveries that are obtained with the composite material in solid-phase extraction.

Solid-phase extraction. Composite material from example 2 is packed into solid-phase extraction cartridges with 60 mg in each cartridge. 1 mL each of MeOH and 20 mM potassium phosphate buffer pH 7.0 is passed through the cartridge to condition the composite material. A solution of 8 test compounds with a concentration of 10 μg/mL of each compound is passed through the cartridge. The cartridge is washed with 1 mL of 20 mM potassium phosphate buffer pH 7.0 and dried by applying vacuum for 1 min. The bound compounds are then eluted with 1 mL of methanol containing 10% of dichloromethane and the recovery of each compound is determined using HPLC. FIG. 4 illustrates the recovery of each compound. The recoveries are consistently high with the average recovery being 98%. The same experiment with a conventional copolymer of divinylbenzene and 1-vinyl-2-pyrrolidone resulted in an average recovery of 89%.

Example 11

Figure 5:
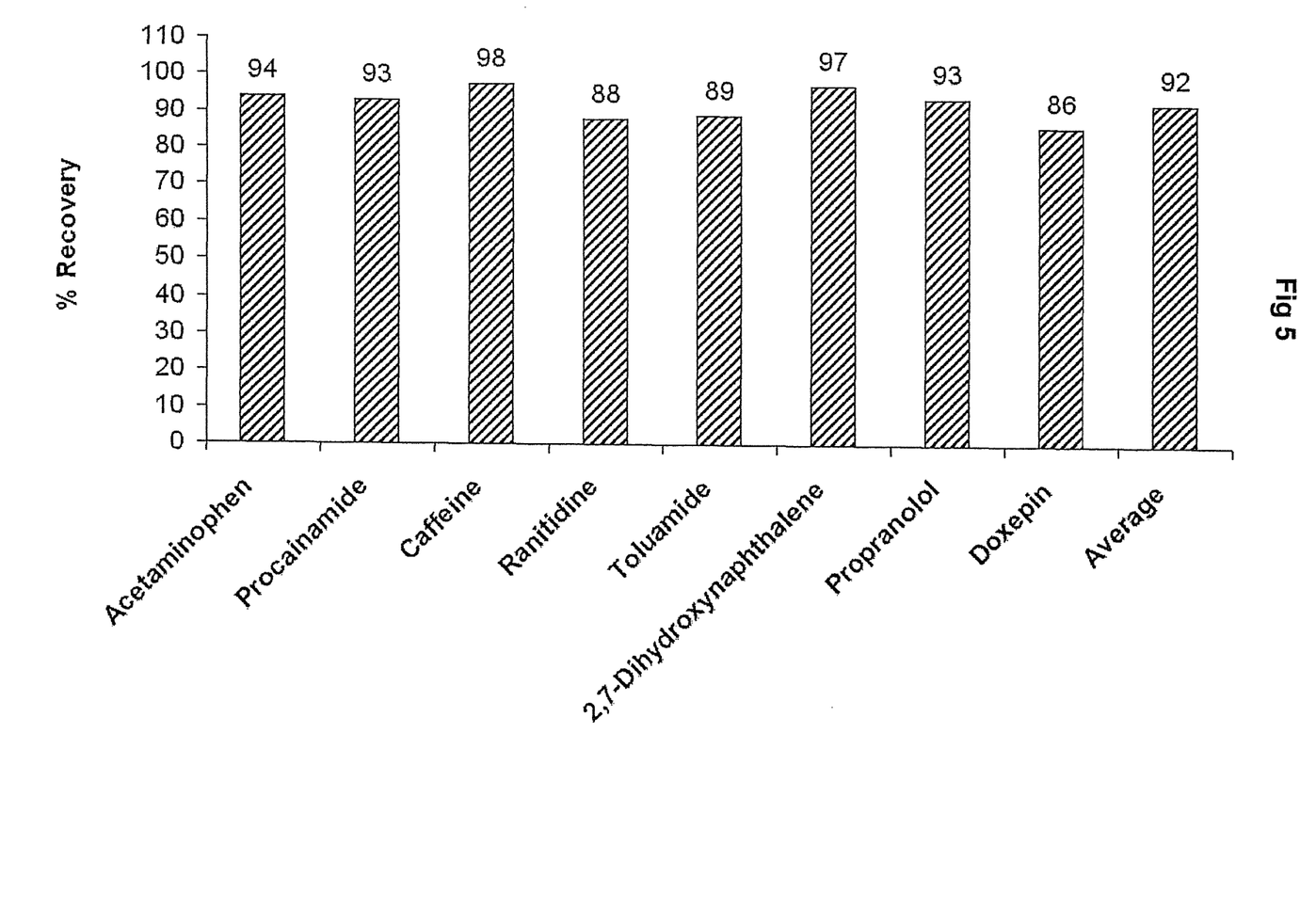
FIG. 5 illustrates the recoveries that are obtained with the composite material in solid-phase extraction after extensive drying before sample application.

Investigation of sensitivity to drying out. Same as example 10, but the cartridge is dried by applying vacuum for 10 minutes before the test solution is applied. FIG. 5 illustrates the recovery of each compound. The recoveries are only slightly lower with the average recovery being 92%, i.e. the sensitivity of the material to accidental drying out is very low.

Example 12

Investigation of the wetting properties. Samples of hydrophobic porous organic polymer beads from example 1, composite material from example 2 and a conventional copolymer of divinylbenzene and 1-vinyl-2-pyrrolidone were placed on a glass plate. One drop of water was carefully placed on top of each sample and wetting of each sample was observed. The hydrophobic porous organic polymer beads and the composite material are not wetted by the water, but the conventional copolymer of divinylbenzene and 1-vinyl-2-pyrrolidone is.

The invention claimed is:

1. A composite material, comprising:
a hydrophobic porous organic polymer bead including a hydrophobic non-porous polymer phase and pores, wherein said hydrophobic non-porous polymer phase internally comprises a hydrophilic polymer, wherein the composite material includes a substantially hydrophobic outer surface and pores having surfaces being less hydrophobic than said outer surface; and wherein the pores are substantially free from the hydrophilic polymer.

2. A composite material according to claims 1, wherein said hydrophilic polymer is obtained from hydrophilic monomers, having at least one polymerizable functional group.

3. A composite material according to claim 1, wherein said hydrophilic polymer is a crosslinked hydrophilic polymer.

4. A composite material according to claim 1, wherein said hydrophilic polymer comprises ionic groups or ionizable groups.

5. A composite material according to claim 4 wherein said hydrophilic monomers is selected from the group consisting of (arvinylbenzyl)trimethylammonium chloride, N,N-diethylaminoethyl methacrylate, methacrylic acid and 2-acrylamido-2-methylpropanesulfonic acid.

6. A composite material according to claim 1, wherein said hydrophilic polymer is obtained from at least one monomer selected from the group consisting of 1-vinyl-2-pyrrolidone, 2-hydroxyethyl methacrylate, acrylamide, methacrylamide, poly(ethylene glycol) monoacrylate, monomethacrylate, diacrylate or dimethacrylate comprising two or more ethylene glycol units, $C_{1-4}$ alkylene bisacrylamide, ethylene glycol dimethacrylate, divinylbenzene, trimethylolpropane trimethacrylate or any combination thereof.

7. A composite material according to claim 1, wherein said hydrophobic porous organic polymer bead is a crosslinked hydrophobic polymer bead.

8. A composite material according to claim 1, wherein said composite material is not water wettable.

9. An extraction method, comprising:
using the composite material according to claim 1 as a solid phase extraction material or a chromatographic separation material.

10. A method for preparing a composite material according to claim 1, said method comprising:
providing at least one hydrophobic porous organic polymer bead comprising a hydrophobic non-porous polymer phase and pores; and a mixture of at least one hydrophilic monomer, selected from monomers having at least one polymerizable group; optionally an initiator; and optionally a solvent;
swelling said bead in said mixture, forming a swollen hydrophobic porous organic polymer bead comprising said mixture internally in the hydrophobic non-porous polymer phase;
polymerizing said at least one hydrophilic monomer; and
obtaining said composite material, wherein the pores are substantially free from the hydrophilic polymer;
wherein all of said mixture is absorbed by said hydrophobic porous organic polymer bead; or any excess removed before polymerization.

11. A method according to claim 10, wherein said mixture comprises at least one monomer having more than one polymerizable group.

12. A method according to claim 10, wherein the at least one hydrophobic porous organic polymer bead is obtained by,
providing a mixture of hydrophobic monomers having at least one polymerizable group and a porogen,
dispersing the mixture in a medium,
polymerizing the hydrophobic monomers, and
obtaining the hydrophobic porous organic polymer bead.

13. An extraction method, comprising:
performing one of a solid phase extraction or a chromatographic separation using the composite material according to claim 1.

14. An extraction method, comprising:
using the composite material according to claim 1 in a solid phase extraction cartridge or chromatography column.

15. A composite material according to claim 2, wherein said hydrophilic polymer is a crosslinked hydrophilic polymer.

16. A composite material according to claim 2, wherein said hydrophilic polymer comprises ionic groups or ionizable groups.

17. A method for preparing a composite material, said method comprising:
providing at least one hydrophobic porous organic polymer bead comprising a hydrophobic non-porous polymer phase and pores; and a mixture of at least one hydrophilic monomer, selected from monomers having at least one polymerizable group; optionally an initiator; and optionally a solvent;
swelling said bead in said mixture, forming a swollen hydrophobic porous organic polymer bead comprising said mixture internally in the hydrophobic non-porous polymer phase;
polymerizing said at least one hydrophilic monomer; and
obtaining said composite material, wherein the pores are substantially free from the hydrophilic polymer;

wherein all of said mixture is absorbed by said hydrophobic porous organic polymer bead; or any excess removed before polymerization.

18. A method according to claim 11, wherein the at least one hydrophobic porous organic polymer bead is obtained by,
providing a mixture of hydrophobic monomers having at least one polymerizable group and a porogen,
dispersing the mixture in a medium,
polymerizing the hydrophobic monomers, and
obtaining the hydrophobic porous organic polymer bead.

* * * * *